UNITED STATES PATENT OFFICE.

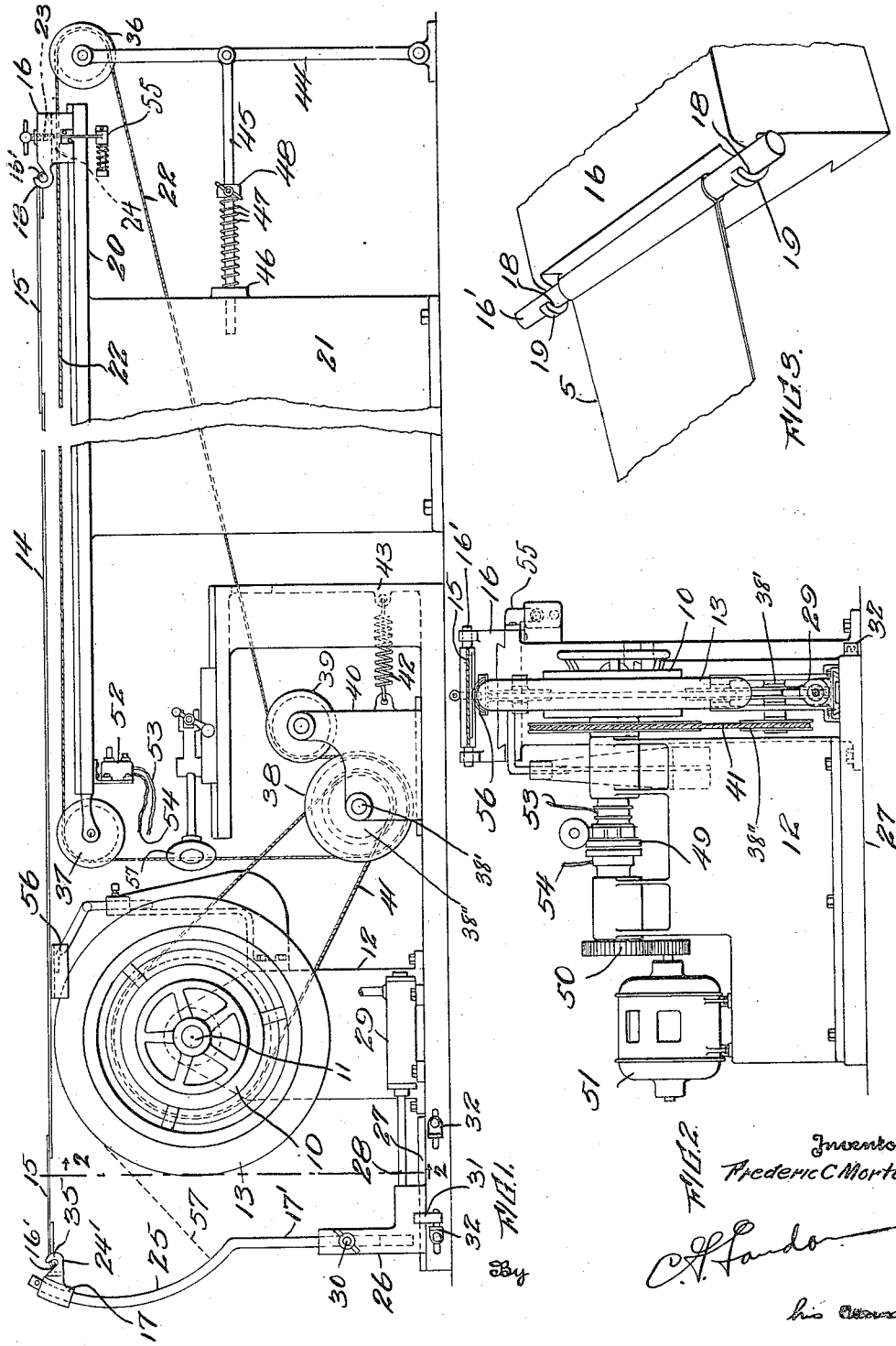

FREDERIC C. MORTON, OF NEW HAVEN, CONNECTICUT.

TIRE-MAKING MACHINE.

1,423,870.  Specification of Letters Patent.  Patented July 25, 1922.

Application filed October 7, 1918. Serial No. 257,227.

*To all whom it may concern:*

Be it known that I, FREDERIC C. MORTON, a citizen of the United States, and resident of New Haven, Connecticut, have invented new and useful Improvements in Tire-Making Machines, of which the following is a specification.

My present invention relates to a tire building machine, and more particularly to the stretching and applying of strips of fabric to build up the tire carcass on a forming core.

In building up the carcass of a pneumatic tire casing, a number of plies or layers of fabric are laid one over the other on the forming core; each ply of the fabric first being connected with the forming core, and the latter then being rotated to wind the plies on the core. The fabric is usually stretched before it is laid on the core, and, prior to my present invention, the stretching action has been effected as the fabric is drawn on the core, through the rotary action thereof, by the use of tensioning or pulling devices.

As one of the principal objects of my invention I propose to stretch a previously cut to length ply of fabric by means which operate independently of the forming core and comprise devices to which the ends of the ply are connected, and which are capable of being moved farther apart to stretch the ply of fabric between them.

More specifically, my invention contemplates stretching the ply of fabric by means of dummy strips to which the forward and rear ends of the ply are connected, and which are connected to devices movable apart to stretch the fabric, the connection of the dummy strip attached to the forward end of the ply preferably being of such a nature that the forward end portion of the ply in its stretched condition can be turned to place it against the outer periphery of the forming core.

My invention also has in view as an important object the provision of means of a positive character for maintaining in stretched condition the ply of fabric which is being drawn onto the forming core.

A further object of my invention is to provide a construction whereby the device to which is attached the rear end of the ply of fabric, is positively driven by a flexible element in such a manner that the movement of the device is at the same rate of speed as that of any point on the outer periphery of the forming core.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention, and throughout the several views of which, similar reference numbers designate corresponding parts:

Figure 1 is a side elevational view of the tire building machine;

Figure 2 is a cross-sectional view taken on the line 2—2 of Figure 1; and

Figure 3 is a fragmentary perspective view illustrating the manner of connecting the dummy strips to the slotted arms or projections.

As shown in the drawings, a chuck 10, which may be of any suitable or approved construction, is arranged on a shaft 11 rotatably mounted upon a support 12. The chuck 10 carries a suitable ring core 13 on which are laid rubberized strips of fabric 14 to build up and form a tire carcass.

In accordance with my invention, the rubberized strips of fabric 14 are first cut to a length approximately equal to that of 90 per cent of the distance around the outer periphery of the forming core 13, and then the ends of each strip of fabric 14 are connected to suitable dummy strips 15 adapted to be connected to a pair of slides 16 and 17 which are actuated independently of the forming core 13 to stretch the strip of fabric 14 before it is placed on the forming core. The ends of the strips of fabric 14 are preferably detachably connected to the dummy strips 15 by simply placing together overlapped ends of the strip of fabric and of the dummy strips to effect adhesion of the overlapped ends by reason of the tacky rubber substance on the strips of fabric 14.

Transverse bars 16′ on the dummy strips 15 are adapted to fit in slots 18 provided in arms or projections 19 on the slides 16 and 17, whereby the dummy strips can easily and quickly be detachably connected thereto.

The slide 16 is slidably mounted on a substantially horizontal frame 20 which is mounted on a suitable support 21, and moves tangentially towards the upper periphery of the core 13.

In order that the slide 16, to which is connected one end of the rear dummy strip, may be detachably connected to a steel belt or wire cable 22 for imparting motion to the slide, it is provided with clamping means which preferably comprise a handscrew 23 threaded in the upper portion of the slide and having a loose connection with a block 24 movably arranged in the slide and adapted to press the steel belt or wire cable, which passes through the slide, against the lower portion thereof.

The slide 17, to which is connected one end of the forward dummy strip, is preferably mounted upon an extensible post 17′ the upper portion 25 of which has telescopic connection to the lower or base portion 26 which is slidably mounted on the frame base 27 and is connected by a rod 28 to a piston, not shown, of a suitable fluid pressure motive device indicated at 29. A set-screw 30 on the base portion 26 of the post is adapted to lock in adjusted position the upper portion 25 in the base portion 26. The extent of movement of the base portion 26 of the post may be limited by providing on the base portion a projection or lug 31 adapted to engage adjustable stops 32 on the frame base 27. The upper portion 25 of the post 17′ is preferably curved, as shown, and it has slidably mounted thereon the slide 17 which is provided with an arm or projection 24′ with slots 35 into which are adapted to fit the transverse bar 16′ of the dummy strip 15 attached to the forward end of the strip of fabric 14. By moving the slide 17 downwardly on the post 25, the forward end portion of the stretched strip of fabric 14 may be moved to dispose it in place against the outer periphery of the forming core 13.

In order that the stretch of the strip of fabric 14 may be maintained without any change while the strip of fabric passes onto the forming core 13, I provide means of a positive character for moving the slide 16, to which is connected the rear end of the fabric strip, at the same speed as that of any point on the outer periphery of the forming core. As shown, the steel belt or wire cable 22 for moving the slide 16 passes over sheaves 36 and 37 arranged at the ends of the frame 20, and over a pulley 38 secured to a shaft 38′ and a sheave 39 which are rotatably mounted on a suitable sliding support 40 of the frame of the machine. Also mounted upon the shaft 38′ in a removable manner is another pulley 38″ so arranged as to permit a chain or wire cable 41 to pass over it, and a pulley mounted upon the chuck shaft 10, to impart power thereto. To tension the wire cables 41 and 22, the support 40 is slidably mounted and connected by a spring 42 to a stationary part 43 of the machine, and the sheave 36 is arranged on a pivotally mounted standard 44 to which is pivotally connected one end of a bar 45 which passes through a guide lug 46 on the support 21 and has thereon a spring 47 which bears against the guide lug 46 and against a block 48 which can be adjusted by sliding and locking it on the bar 45.

The shaft 11 is connected to one clutch member of an electro-magnetic clutch 49 which has its other clutch member connected by drive connections 50 to the electric motor 51.

In order to automatically stop the movement of the chuck 10 and the device 16 when the stretched strip of fabric 14 has been wound on the forming core 13, a switch 52, connected by conductors 53 and 54 to the electro-magnetic clutch 49, is arranged at the forward end of the frame 20 and is adapted to be opened by a projection 55 on the slide 16, which engages a movable member of the switch.

A suitable device 56 for guiding and shaping the strip of fabric 14 as it passes onto the forming core 13 may be mounted on the support 12. Other devices that are commonly incorporated in a tire building machine are not shown in the drawings.

From the foregoing it will be understood that in operation the dummy strips 15 are attached to the ends of the fabric strips 14 and connected to the slides 16 and 17, the slide 17 being moved to its forward position. The slide 16 may be then disconnected from the wire cable 22 and moved rearwardly to take up the slack in the dummy strips 15 and fabric strip 14, and then fastened again. The fluid pressure motor 29 may now be operated to move the post 17′ from its position adjacent to the forming core 13, to stretch the fabric strip 14 the desired length. The stops 32 can be adjusted to control the extent of movement of the post 17′ and also the amount of stretch placed upon the fabric strip 14. The dummy strips 15 may be of inextensible material. After the fabric strip 14 is stretched the slide 17 may be moved downwardly on the post 17′ so that the forward dummy strip 15 assumes the position indicated by the dotted line 57 in Figure 1, and the forward portion of the fabric strip 14 is disposed against the forming core. Then the dummy strip may be stripped off of the forward end of the fabric strip 14, and the switch 52 closed to actuate the electro-magnetic clutch 49 to effect slow rotation of the forming core 13. As the fabric strip 14 is wound on the forming core 13, the slide 16 moves toward the forming core at the same speed as that of the movement of any point on the outer periphery of the forming core, so that the stretch of the fabric strip 14 is maintained without change. By the automatic opening of the switch 52, through action of the projection 55 on the slide 16, the movement of the slide 16 and of the forming core 13 is stopped when the fabric strip 14 has been completely wound on the forming core. When this occurs, the rear dummy strip may be stripped off and the ply of fabric stitched or smoothed down in the usual manner by means of stitchers such as conventionally shown at 57. The pulley 38" is preferably removably mounted so that it can be replaced by a pulley of a different size when it is desired to build a tire carcass of different size. The wire cables 22 and 41 are so arranged and tensioned that there is practically no slip and the result is therefore a synchronized drive between the core and the slide 16, as will be understood.

What I claim is:

1. In a tire building machine, the combination of spaced stretching devices, means including dummy strips for connecting the ends of a strip of fabric to said spaced devices, and means to space said devices farther apart and thereby effect a stretching of the strip of fabric.

2. In a tire building machine, the combination of spaced stretching devices, dummy strips adapted for attachment to the ends of a strip of fabric, means for detachably connecting the ends of said dummy strips to said devices, and means to effect movement of one device to dispose it farther away from the other device and thereby stretch the strip of fabric.

3. A tire building machine, including a core for forming a fabric tire carcass, having spaced devices for stretching the fabric, and means on one of the devices for moving the stretched fabric to place it against the core.

4. In a tire building machine, the combination with a core for forming a fabric tire carcass, of relatively movable spaced devices for stretching the fabric, and means on one of the devices for moving one end portion of the stretched fabric to dispose it against the periphery of the core.

5. A tire building machine, including a forming core, having devices for longitudinally stretching a strip of fabric, and means on one of the devices for moving one end portion of the strip of fabric to dispose it against the periphery of the forming core.

6. In a tire building machine, the combination of an endless cable, a movably mounted device detachably connectable to said cable, a movably mounted post, and means for detachably connecting a strip of fabric to said device and said post.

7. A tire building machine, including a core for forming a fabric tire carcass, having means for stretching a strip of fabric, said means including a post, and a member movably mounted on the post for moving one end portion of the strip of fabric to dispose it against the periphery of the forming core.

8. In a tire building machine, including a core for forming a fabric tire carcass, the combination of a cable, a movably mounted device detachably connectable to said cable, a post, means for detachably connecting a strip of fabric to said device and to said post, and a member movably mounted on said post for moving one end portion of the strip of fabric to dispose it against the periphery of the core.

9. A tire building machine, including a core for forming a fabric tire carcass, and comprising in combination a cable, means for stretching a strip of fabric, said means including a device detachably connectable to said cable and movable to take up the slack of the strip of fabric, means for rotating said core and means for driving said cable whereby said device is moved toward the core at the same speed as that of the movement of any point on the outer periphery of the core.

10. In a tire building machine including a core for forming a fabric tire carcass, the combination of spaced devices, dummy strips detachably connected to the ends of a strip of fabric, and means for connecting the ends of said dummy strips to said devices, one of said devices consisting of a post movable away from the other device to effect a stretching of the strip of fabric before the latter is applied to the core.

11. In a tire building machine including a core for forming a fabric tire carcass, the combination of spaced devices, dummy strips detachably connected to the ends of a strip of fabric, and means for connecting the ends of said dummy strips to said devices, one of said devices consisting of a post movable away from the other device to effect a stretching of the strip of fabric before the latter is applied to the core, said post having its upper portion telescopically connected to its lower portion.

12. A method of building a tire carcass, which involves first stretching a strip of fabric, then connecting one end of the stretched strip of fabric to a forming core, and then rotating the forming core and winding the strip of fabric in stretched condition thereon.

13. A method of building a tire carcass, which involves first stretching a strip of fabric longitudinally, turning the forward end portion of the strip of fabric in its stretched condition toward the core to attach it thereto, rotating the core and winding the strip of fabric in its stretched condition thereon.

14. In a tire building machine, the combination with a rotatable core for winding up a strip of fabric, of means for stretching the fabric longitudinally said means being operable independently of the core, and means actuated through rotational movement of the core for maintaining the fabric in its stretched condition during the winding operation.

In witness whereof, I have hereunto signed my name in the presence of two subscribing witnesses.

FREDERIC C. MORTON.

Witnesses:
OLIVER E. LAPHAM,
RALPH E. GILLIS.